Nov. 22, 1966   R. L. STURM   3,286,431
PACKAGING PROCESS
Filed Oct. 4, 1963
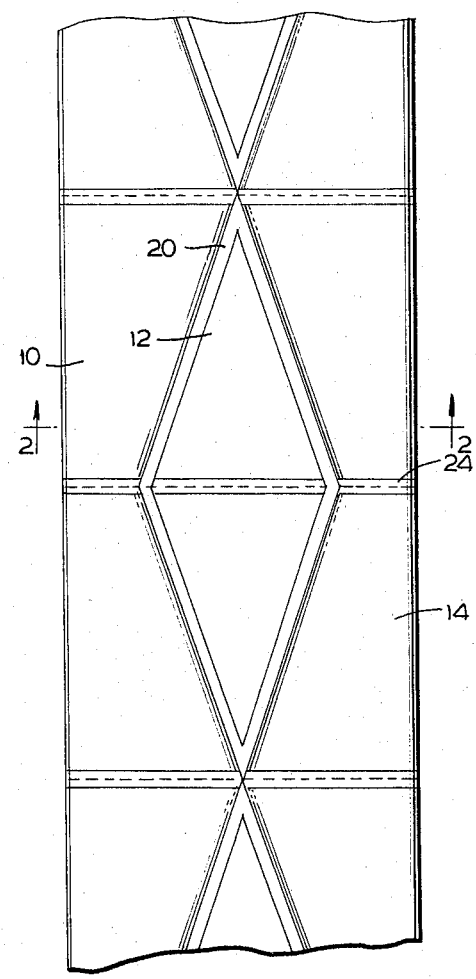
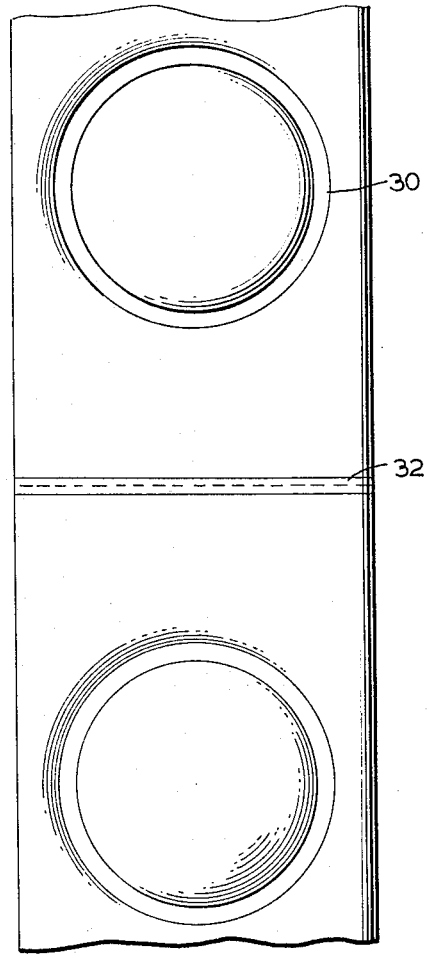
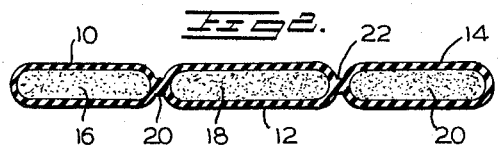

3,286,431
PACKAGING PROCESS
Rex L. Sturm, 2939 Van Ness St. NW.,
Washington, D.C.
Filed Oct. 4, 1963, Ser. No. 314,037
6 Claims. (Cl. 53—37)

This invention relates to a method of filling and producing containers. More specifically, this invention relates to multi-compartment and multi-ingredient packages and methods of filling and producing them.

Multi-compartment containers provide convenient and attractive packages for many products. With the advent of premeasured food mixes of such products as cakes, pastries, salad dressings and a host of other food mixtures, packaging methods which are efficient, sterile and of accurate measurement are required.

With the development of multi-compartment packaging methods meeting these requirements the advantage of the multi-compartment containers can be extended to other fields. For example, epoxy resin adhesive could be packaged with the two ingredients in a separate portion of a single package, or pharmaceutical products could be packaged conveniently in this form of package.

It is an object of my invention to provide methods of producing and filling multi-compartment containers which will be efficient, sterile and capable of forming accurately measured container portions.

A further object of my invention is to provide a method of sequentially filling multi-compartment containers with a plurality of ingredients.

The basic steps of my method are as follows:
(1) Filling a length of tubing of a thermoplastic nature with a first product of a fluid nature.
(2) Subjecting the tubing to pressure between a pair of opposed tools being of lesser width than the width of the filled tubing.
(3) Pressing the walls of the tubing into contact with each other, thereby segregating a portion of the fluent material from the remainder of fluent material in said tubing.
(4) Creating heat through said tools to weld the contacting walls together to seal off said segregated portion.
(5) Repeating the steps of segregating by pressing and welding at intervals along the length of said tubing, whereby the length of tubing contains segregated portions and intercommunicating portions along the length of tubing.
(6) Evacuating the fluent material remaining within the intercommunicating channels of said welded tubing.
(7) Introducing a second product of a fluent nature into said intercommunicating channels.
(8) Segregating by pressing and welding portions of said intercommunicating channels.
(9) Severing said tubing within the width of the welded portion defining an area containing at least two segregated portions with one of said portions containing said first fluent material and the other of said portions containing said second product of a fluent nature.

Patent No. 2,848,854, which is a modification of the process defined in Patent No. 2,530,400, describes a process whereby single containers are formed by filling a container in tubing form with a fluid material and by a pair of opposed tools, each having a cavity shaped according to the desired container shape, pressure is applied to the walls of the tubing to displace the contents at the pressure points and to bring the walls into contact with each other, thereby surrounding and enclosing a quantity of fluid substance contained between the walls of the tubing. By generating heat through the pressure tools, the contacting walls of the tubing are welded together. Since the opposed tools with shaped cavities are narrower in width than that of the filled tubing, intercommunicating passages remain along the length of the tubing. In the method shown in Patent No. 2,848,854 the tubing is severed along the middle of the width of the welded portion to provide single containers. The remaining portion of the contents is emptied from the tubing and then reclaimed for reuse. The tubing is re-extruded or calendered for the production of packaging material. The methods shown in Patent 2,848,854 may be suitably applied to the first steps of this invention.

FIGURE 1 shows a series of packages produced according to the present invention.

FIGURE 2 is a cross-sectional view through lines 2—2 in FIGURE 1.

FIGURE 3 is a cross-sectional view of the tubing of FIGURE 1 before material is fed into the tubing.

FIGURE 4 is a view of another form of package produced by the present invention.

One method of producing my multi-product, multi-compartment container can be carried out in the following manner. A tubing of pliable, non-metallic material of a thermoplastic nature, for example polyethylene, is filled with a first product of a fluent nature. The ends may be sealed or other means used to confine the material within the length of tubing. Patent No. 2,530,400 shows one method of performing this step. The length of tubing is successively positioned between a pair of opposed presser tools which are shaped so that when they are applied to opposite sides of the length of tubing they surround and segregate a portion of the fluent material within the tubing. When sufficient pressure is applied to the tools the opposed walls of the tubing are brought into contacting engagement. The contacting portions are heated to welding temperature. While radio frequency heating may be preferred, any heating method may be used which will suitably weld the contacting portions. Persons skilled in the welding of thermoplastic materials might devise other suitable methods of welding the contacting portions. These steps are performed successively at intervals along the length of the tubing so that a series of segregated portions are formed with the remaining portions connected by intercommunicating channels.

After the desired portions are formed along the desired length of tubing, evacuation of the intercommunicating channels is performed by suitable methods. Patent No. 2,848,854 accomplishes this step by means of a pair of opposed rollers. However, since the rollers would be held apart by the portions of the tubing containing the first product of a fluent nature other methods are preferred. For example, the tubing might by upended to allow gravity forced drainage. I prefer to open one end of said tubing and inject gas under pressure at the other end of said tubing or at a suitable point along the length. If an intermediate point were used a needle or other penetrating means might be used to inject the gas into the tubing.

In some cases, depending upon the nature of the first and second products of a fluent nature, the second product might be introduced under sufficient pressure as to force the first product from the intercommunicating channel. This would, of course, require means for sealing off said tubing after the evacuation of the first product from the passages and before the expulsion of the second product. A material which is immiscible with both the first and second fluent materials may be injected to separate the materials and to clearly indicate where the first material has been completely evacuated. A pressing and welding step may be used to prevent the expulsion of the second material after the first material has been removed.

If gas pressure or pressure rollers are used to evacuate the passages, the next step would be in introducing a second product of a fluent nature into the intercommunicating passages.

When the tube has been filled with the second fluent material the length of tubing is again progressively passed between opposed presser tools. However, in this operation the opposed presser tools are of different configuration. They may, for example, be merely a straight member at least as wide as the flattened tubing. They may also be of other designs such as zig-zag, curved, V-shaped, etc. The important consideration is the dimension across the width of the tubing. This must be sufficiently wide so that when the opposed presser tools are forced against the sides of the tubing the fluent material within one length of the tubing will be completely segregated from the fluent material in the other length of tubing. Heat welding is then performed at the presser tool contacts. Successive pressing and welding operations at intervals along the length of tubing will thus produce lengths containing segregated portions of fluent material.

Since the previous operation has produced segregated portions of the first material the result will be segregated portions of the first material and of the second material along the length of tubing. A cutting or perforating operation can then be performed to produce packages which include a segregated portion of said first material and a segregated portion of the second material. Since the welded seams which segregate the channels containing the second material extend across the width of the tubing, the severance should be within this welded portion so that separate sealed packages can be formed. As an example of a type of package which may be formed according to this invention, a first sealed portion containing first product may be contained within a second sealed portion containing second product with the seal for the portion containing the second product being severed from the remainder of the package.

While this example has only included two products, it should be noted that the invention is not limited to this arrangement. Successively, different fluids may be introduced into the tubing, different portions may be sealed off, the remainder of each fluid may be evacuated, and the final severance of a portion including two or more segregated portions may be performed. In this manner a multitude of combination packages may be formed.

The important feature in the successive steps is the presence of suitable intercommunicating passages along the length of tubing so that a single filling opening may be used to fill all the intercommunicating passages. Prior multiple product packages have required the successive filling of each compartment followed by a sealing step. The efficiency of my method makes the greater use of multi-ingredient packages possible and may be utilized to produce heretofore unattainable attractive packages.

Ornamentation of packages may be provided by forming the presser tools of various shapes. Circles, stars, diamonds and a multitude of other geometrical shapes may be the form of the welded portion sealing off the first product within the package. If the materials included in the various portions are appropriately colored an attractive variegated appearance can be achieved which will bring it to the forefront in the competition for the fickle housewife's purchasing eye in her trips to the market place.

However, in my preferred form of the invention the design is secondary to the efficiency of the packaging methods required. Since the materials must be efficiently evacuated from and injected into the intercommunicating passages, the form of the welded portions should be designed with fluid flow characteristics in mind. Rounded edges and gradually curved seams can be designed to meet this requirement. To this end the flow characteristics of the materials to be injected may be profitably studied. Forms which will immediately suggest themselves are teardrop shapes and elongated diamond shapes.

The accurate measurement of the appropriate volume of materials can be achieved by designing the presser tools to the appropriate size or by accurately determining the length of tubing which will be segregated and severed.

Referring now to FIGURE 1, a form of package which may be produced by the above-described method is shown. A sheet of tubing originally in the condition shown in FIGURE 3 could be processed to form a package as shown in FIGURE 1. Section 12 may be filled with a first product of a fluent nature as shown by the expanded receptacle portion 18 in section 12 as shown in FIGURE 2. Section 10 and section 14 are shown to be completely segregated from each other. With this arrangement the receptacle 16 between the sides of section 10 may contain a second product and receptacle 20 between the sides of section 15 may contain a third product. Sections 10 and 14 may also be filled with the same material in which case it is preferable that they be interconnected. Heat seals 20 and 22 separate the material in section 12 from the material in sections 10 and 14. Heat seals 24 and 26 separate the materials in one length of tubing from those in another. The packages may then be severed and a single package would be formed including sections 10, 12 and 14. If a series of packages were desired the heat seals 24 and 26 could merely be perforated to allow ready detachment.

A second form of package is shown in FIGURE 4 in which a circular heat seal 30 separates a section containing a first product from the remainder of the package which contains a second product. Successive packages are separated by a heat seal 32 and may be severed or perforated along the heat seal 32 to form separate packages containing two product sections.

While I have described specific forms of my invention these should not be considered as delimiting the breadth of my inventive concept.

Variations and modifications will suggest themselves to those skilled in the art. Therefore, the full scope and spirit of the following claims and not the above specific description should be considered as definitive of the concept for which protection is afforded.

I claim:
1. The method of forming multi-compartment containers from a pliable tubing of non-metallic material of at least in part thermoplastic nature, comprising,
   (a) filling a length of tubing of a thermoplastic nature with a first product of a fluid nature.
   (b) subjecting the tubing to pressure between a pair of opposed tools being of lesser width than the width of the filled tubing.
   (c) pressing the walls of the tubing into contact with each other, thereby segregating a portion of the fluent material from the remainder of fluent material in said tubing.
   (d) creating heat through said tools to weld the contacting walls together to seal off said segregated portion.
   (e) repeating the steps of segregating by pressing and welding at intervals along the length of said tubing, whereby the length of tubing contains segregated portions and intercommunicating portions along the length of tubing.
   (f) evacuating the fluent material remaining within the intercommunicating channels of said welded tubing.
   (g) introducing a second product of a fluent nature into said intercommunicating channels.
   (h) segregating by pressing and welding portions of said intercommunicating channels.
   (i) severing said tubing within the width of the welded portion defining an area containing at least two segregated portions with one of said portions containing said first fluent material and the other of said portions containing said second product of a fluent nature.
2. A method according to claim 1 wherein said first material is evacuated by forcing gas through said intercommunicating passages.

3. A method according to claim 1 wherein said first fluent material is evacuated by forcing said second product of a fluent nature into one end of said intercommunicating passages and expelling said first fluent material from the other end of said passages.

4. A method according to claim 3 wherein a material is introduced between said first and second materials which is immiscible with both of said fluids.

5. A method according to claim 1 wherein at least two materials are introduced into said tubing and pressing and welding of segregated portion is performed followed by evacuation of the portion remaining within segregated portions evacuated with a final product of a fluent nature injected within said intercommunicating passages followed by pressing, welding and severing across the length of said communicating passages.

6. The method of forming multi-compartment containers from a pliable tubing of non-metallic material of at least in part thermoplastic nature comprising,
   (a) filling a length of tubing with a first product of a fluent nature.
   (b) subjecting the tubing to pressure between a pair of opposed tools having cavities within their periphery, the pressing portion of said tools being of lesser width than the width of the filled tubing, thereby filling out said cavities and displacing the fluent material at the pressure places, bring the walls of the tubing into contacting engagement with each other, leaving an excess of fluid material in the space between the area defined by the periphery of the said tools and the edges of said length of tubing and within the area defined by the periphery of the said tools.
   (c) generating heat by the said presser tools to weld the contacting walls together to surround the said cavities.
   (d) repeating the steps of pressing and welding at suitable intervals along the length of said tubing.
   (e) evacuating the intercommunicating channels of said welded tubing.
   (f) introducing a second product of a fluent nature into said intercommunicating channels.
   (g) subjecting the tubing to pressure between a pair of opposed tools, said tools being at least as wide as said tubing, thereby displacing the fluent material at the pressure places, bringing the walls of the said tubing into contacting engagement with each other across the width of said tubing.
   (h) generating heat by the said presser tools to weld the contacting walls together to surround the said cavities.
   (i) repeating the steps of pressing and welding across the width of said tubing at intervals along the length of said tubing.
   (j) severing said tubing within the width of the welded portion across the width of said tubing, whereby successive closed containers are formed having a first product of a fluent nature sealed in a portion of said container of lesser width than the edges of said tubing, and a second product of a fluent nature sealed in the remainder of said container by the welded portion across the width of said tubing.

No references cited.

FRANK E. DAILEY, *Primary Examiner.*

S. ABEND, *Assistant Examiner.*